United States Patent
Carpineto et al.

(10) Patent No.: US 7,200,372 B2
(45) Date of Patent: Apr. 3, 2007

(54) REDUCTION OF DYNAMIC DC OFFSETS IN A WIRELESS RECEIVER

(75) Inventors: Lorenzo M. Carpineto, Antibes (FR);
Angel Ezquerra-Moreu, Cagnes-sur-Mer (FR); Estelle Nguyen, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 373 days.

(21) Appl. No.: 10/770,947

(22) Filed: Feb. 3, 2004

(65) Prior Publication Data

US 2005/0026583 A1 Feb. 3, 2005

(30) Foreign Application Priority Data

Jul. 30, 2003 (EP) .................. 03291928

(51) Int. Cl.
*H04B 7/00* (2006.01)
*H04B 1/06* (2006.01)

(52) U.S. Cl. ............. 455/130; 455/232.1; 455/234.1; 455/242.2; 375/345

(58) Field of Classification Search .. 455/232.1–253.2, 455/136, 138; 375/345
See application file for complete search history.

(56) References Cited

U.S. PATENT DOCUMENTS

| | | | |
|---|---|---|---|
| 5,579,347 A | 11/1996 | Lindquist et al. | |
| 6,442,380 B1 | 8/2002 | Mohindra | |
| 6,571,083 B1* | 5/2003 | Powell et al. | 455/69 |
| 6,980,786 B1* | 12/2005 | Groe | 455/314 |
| 2002/0142745 A1* | 10/2002 | Kang et al. | 455/232.1 |
| 2003/0025623 A1* | 2/2003 | Brueske et al. | 341/139 |
| 2003/0064692 A1* | 4/2003 | Shi | 455/232.1 |
| 2004/0152432 A1* | 8/2004 | Gu | 455/136 |
| 2005/0047533 A1* | 3/2005 | Ruelke et al. | 375/345 |

* cited by examiner

*Primary Examiner*—Simon Nguyen
(74) *Attorney, Agent, or Firm*—Steven A. Shaw; W. James Brady; Frederick J. Telecky, Jr.

(57) ABSTRACT

A gain control system in a Direct Conversion Receiver or similar receiver, includes an automatic gain control circuit which determines whether a low noise amplifier, which amplifies signals from an antenna prior to mixing with signals from a local oscillator, should be set to a high gain or a low gain. The output of the mixer is analyzed by a blocker detect circuit to determine whether a blocker signal is present. Based on the presence of a blocker signal and the power level of the useful signal, the gain of the low noise amplifier may be reduced from the high gain to an intermediate gain in order to reduce self mixing between the radio frequency and local oscillator ports of the mixer, which may lead to dynamic DC offsets.

14 Claims, 3 Drawing Sheets

REDUCTION OF DYNAMIC DC OFFSETS IN A WIRELESS RECEIVER

This application claims priority under 35 USC § (e)(1) of European Application Number 03291928.4 filed Jul. 30, 2003.

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to wireless communications and, more particularly, to a method and apparatus for reducing dynamic DC offsets in a wireless receiver.

2. Description of the Related Art

Dynamic DC-offset is a problem that affects most wireless receivers. This problem manifests itself as an additional time varying DC (direct current) offset to the received signal. There are many reasons for DC offset, and one of the most common is the mismatch between the receiver components. A Direct Conversion Receiver is a type of receiver that is more heavily affected than others by the DC offset problem.

FIG. 1a illustrates a basic block diagram of a Direct Conversion Receiver 10. In a Direct Conversion Receiver, the received RF (radio frequency) signal $x(t) \cdot \cos(2\pi f_0 t + \phi(t))$, received at antenna 12, is moved to the baseband frequency by amplifying the received signal at LNA (low noise amplifier) 14 and mixing the amplified signal at mixer 16 with the output of a LO (local oscillator) 18 that has the same frequency, $\cos(2\pi f_0 t)$, as the carrier frequency of the incoming signal. The output of the mixer 16 is amplified by VGA (variable gain amplifier) 20. LNA 14 and VGA 20 are controlled by AGC (automatic gain control) 22, which determines the correct gain for each amplifier based on the power of the useful signal. Blocker signals (described in greater detail below) are detected by blocker detect circuitry 24 from the RF signal at the antenna; the baseband processor is notified regarding the existence of a blocker signal.

Due to coupling between the RF and LO inputs to the mixer 16, a part of the RF signal will go to the LO input to the mixer 16, and a part of the LO signal will go to the RF input to the mixer 16. Thus, the RF signal will not only be mixed with the LO signal, but also with itself (it will "self-mix"), and the same thing will happen to the LO signal. This will create an extra baseband component, commonly called DC offset because, when the RF signal is phase or frequency modulated, the result of self-mixing is a zero frequency term plus an extra term at twice the carrier frequency which can be easily filtered out. This DC offset will be added to the demodulated signal within the mixer, and thus cannot be filtered out.

The equation for the signal at the output of the mixer is:

$$[x(t) \cdot \cos(2\pi f_0 t + \phi(t)) +$$
$$\beta \cdot \cos(2\pi f_0 t)] \cdot [\cos(2\pi f_0 t) + \alpha \cdot x(t) \cdot \cos(2\pi f_0 t + \phi(t))] =$$

-continued
$$\frac{1}{2}[x(t) \cdot (\cos(\phi(t)) + \cos(4\pi f_0 t + (t))) + \beta \cdot (1 + \cos(4\pi f_0 t))] +$$
$$\frac{1}{2}[\alpha \cdot x(t)^2(1 + \cos(4\pi f_0 t + 2 \cdot \phi(t))) +$$
$$\alpha \cdot \beta \cdot x(t) \cdot (\cos(\phi(t)) + \cos(4\pi f_0 t + \phi(t)))]$$

After filtering, the output of the mixer can be described by:

$$\frac{1}{2}[(1 + \alpha \cdot \beta) \cdot x(t) \cdot \cos(\phi(t)) + \beta + \alpha \cdot x(t)^2]$$

As can be seen, there are three terms remaining after filtering. The first term is equal to the desired signal multiplied by a factor $1+\alpha\beta$, which varies with time, because $\alpha$ and $\beta$ depend on the coupling between the mixer inputs, the position of the mobile, and other factors. The second term is a pure DC offset term $\beta$ due to the self-mixing of the LO, and the third term is an DC offset term due to the self-mixing of the RF input signal. If the RF signal has constant envelope, this term is another pure DC offset factor, but if it has a variable envelope, as is the case for an EDGE (Enhanced Datarates for GSM Evolution) signal, this term will have a certain bandwidth.

Assuming that $\alpha$ and $\beta$ are small (as they should, because they represent a coupling phenomenon), the term $\alpha\beta$ will be negligible and this source of interference can be ignored. Thus, the main interference will be due to the $\alpha$ and $\beta$ terms. This term can change with time, because coupling depends on temperature and many other variables. But most of those variables change very slowly, and can be considered as "locally" constant; i.e., within a burst, or several burst, the variables will not change significantly. In reality, conditions which affect the $\alpha$ and $\beta$ values are almost constant, but it will be assumed that they can change after several seconds.

The major problem is represented by the term $\alpha \cdot x(t)^2$. This problem increases with higher levels of $x(t)$.

The LNA 14 adds gain in order to reduce the overall noise figures of the receiver. This is very important when the power level of the useful signal is low in order to preserve a good Signal-to-Noise Ratio (SNR). This good SNR is necessary to insure that the receiver signal can be demodulated correctly by the receiver.

However, increasing the power level of the useful signal increases the SNR as well; thus, at higher levels of the useful signal, the importance of this initial gain from the LNA decreases accordingly. It can even become necessary to reduce the LNA gain to avoid saturating the reception chain or having a high DC-offset added to the useful signal. This is done by an AGC (automatic gain control) system, which traditionally has one input, the useful signal power (calculated by the DSP), and one output, the ideal gain for the following bursts. Thus, this AGC system is "uni-dimensional".

Blocker signals (also referred to as "blockers" or "interferers") complicate the dynamic DC offset problem. A blocking signal is a signal found at the mobile antenna 12 at a frequency different from the useful signal frequency. IN a GSM system, blocker signals usually belong to other users transmitting at different frequencies. Those signals are generally bursted, but could be continuous.

FIG. 1*b* illustrates the effects of a blocker signal on the useful signal. The blocker signal can create a static DC offset which is easily filtered out and a dynamic DC offset which is not easily filtered out. The dynamic DC offset may be caused either by a time-varying blocker envelope or if the blocker signal appears for only a portion of the receive burst of the useful signal. If there is a large blocker signal at the antenna, traditional AGC systems will exacerbate the dynamic DC offset problem, because using a high LNA gain also increases the effects of the blocker signal, thus increasing the dynamic DC-offset generated by the blocker signal.

One solution to this problem has been to use a DSP to track and compensate for the DC offset from the binary data. While this solution works in many instances, it has several drawbacks. First, it is computationally intensive, which has a non-negligible impact on the overall power consumption of a wireless device. Second, it will not work with all types of blocker signals, only constant or semi-constant envelope blocker signals.

Therefore, a need has arisen for a method and apparatus for compensating for DC offsets which works with all types of blocker signals without using excessive computational or power resources.

BRIEF SUMMARY OF THE INVENTION

In the present invention, a receiver includes a low noise amplifier having a variable gain. The low noise amplifier inputs a radio frequency signal, including a useful signal modulated at a carrier frequency, and outputs an amplified radio frequency signal. A local oscillator generates a local oscillator signal at the carrier frequency and a mixer mixes the amplified signal and the local oscillator signal to output a demodulated signal. Detection circuitry detects whether a blocker signal is present on the radio frequency signal. Control circuitry controls the gain of the low noise amplifier responsive to a power level of the useful signal and the presence of the blocker signal.

The present invention provides significant advantages over the prior art. Adjusting gain based on both the power level of the useful signal and the presence of a blocker allows for reduction of coupling between the RF and LO inputs to the mixer when a blocker is present, thus reducing the effect of dynamic DC offsets.

In a second aspect of the invention, the detection of a blocking signal is performed on the demodulated baseband signal at the output of the mixer, such that the detection can be performed at low frequency.

By checking for the presence of a blocking signal from the low frequency signal at the output of the mixer, a simpler, reduced power detection circuit can be used.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 2:
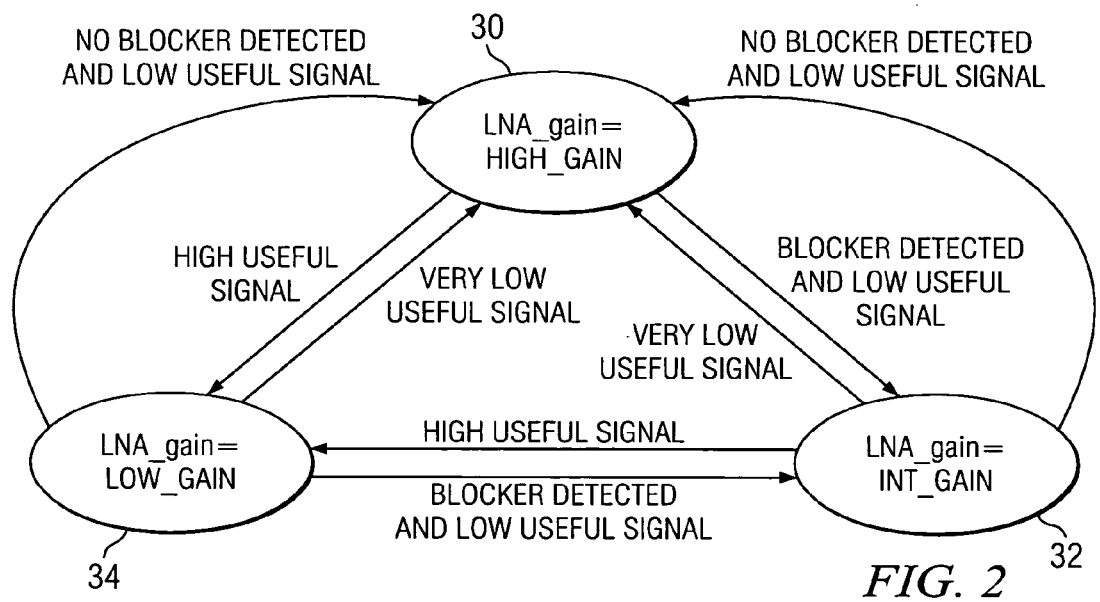
FIG. 2 illustrates a state diagram illustrating a basic operation for a gain control system that works in conjunction with standard automatic gain control systems for reducing dynamic DC offset due to blocker signals.
Figure 3:
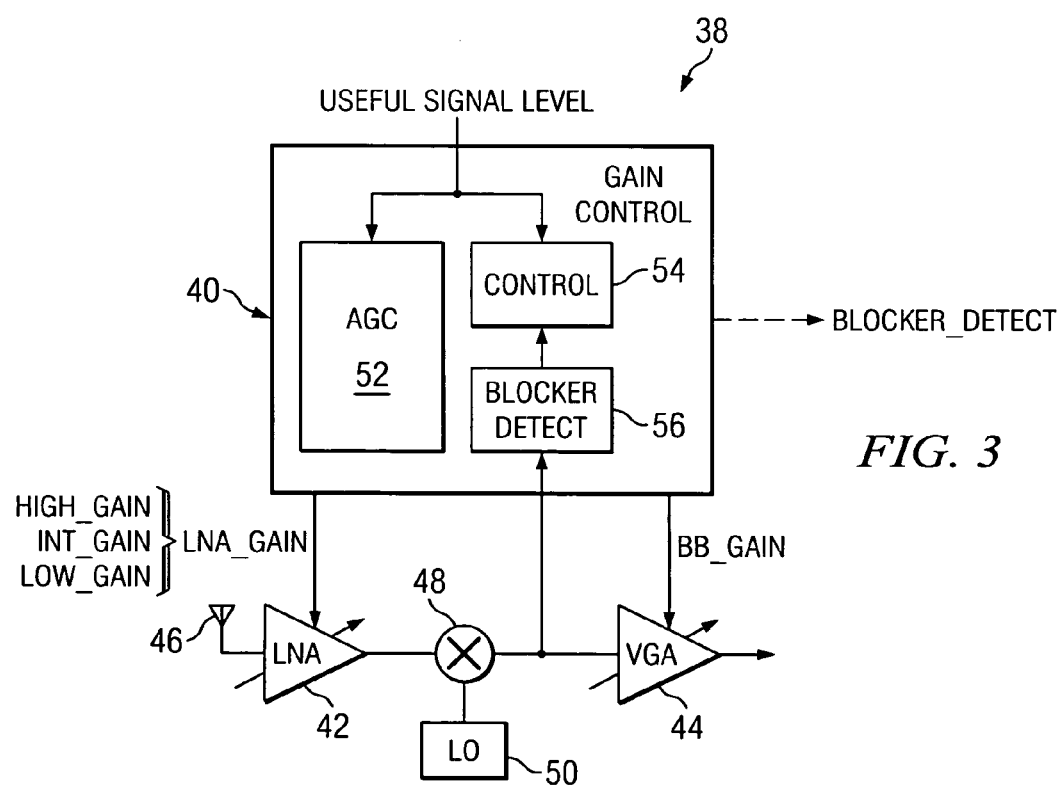
FIG. 3 illustrates a block diagram of a Direct Conversion Receiver using gain control system implementing the method shown in FIG. 2.
Figure 4:
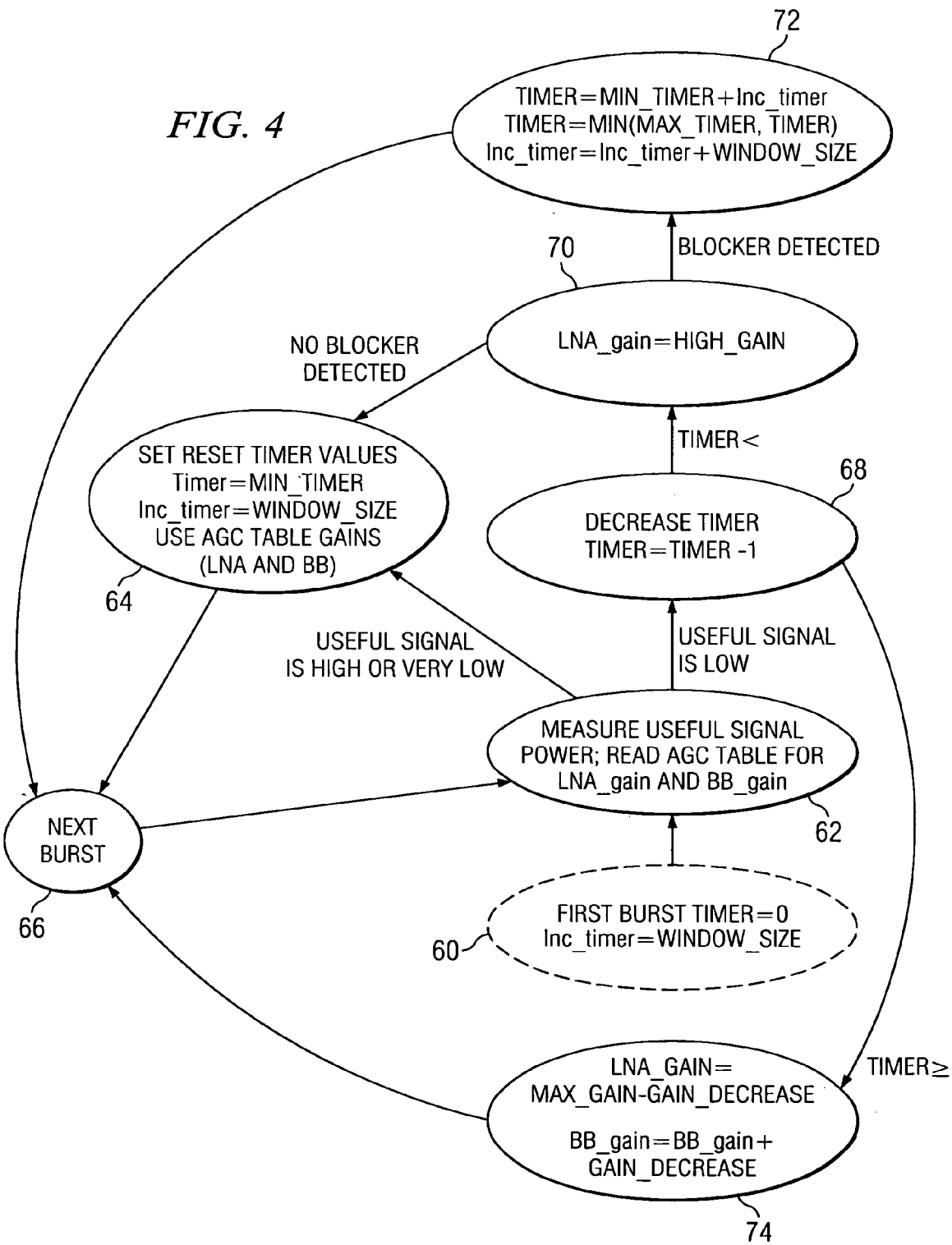
FIG. 4 illustrates a state diagram illustrating operation of the gain control system of FIG. 3, using increasing intervals to confirm the continued presence of a blocker signal.

The present invention is best understood in relation to FIGS. 2–4 of the drawings, like numerals being used for like elements of the various drawings.

FIG. 2 illustrates a state diagram illustrating a basic operation for a gain control system that works in conjunction with standard automatic gain control systems for reducing dynamic DC offset due to blocker signals.

In FIG. 2, the LNA-mixer of a Direct Conversion Receiver, or similar receiver, is placed in one of three states: a high gain state 30, intermediate gain state 32, or low gain state 34. The gain levels for the high gain state 30 and low gain state 34 are similar to those used by current day AGCs. The LNA gain is set to the high level when there is no blocker signal detected and the useful signal is at a "low" level (i.e., benefiting from amplification at high gain) or when a blocker signal is detected, but the useful signal is at a "very low" (i.e., the power level of the useful signal is so low that reducing the LNA gain from high gain would increase the noise too much). While the LNA gain is high, the VGA gain is set according to normal AGC techniques.

The LNA gain is set to a low level when the power level of the useful signal is high (i.e., amplification of the useful signal at high gain could cause saturation of the analog-to-digital circuits). This is true whether or not there is a blocker signal present. While the LNA gain is low, the VGA gain is set according to normal AGC techniques.

In the case where there is a blocker present and where the useful signal is neither very low or high, an intermediate gain, with a level between the high gain and low gain, is used. Lowering the gain from a high value to an intermediate value somewhat increases the noise, but it also reduces the effect of the blocker signal dramatically. To compensate for the reduction in gain, the baseband AGC gain (gain of the VGA) can be increased by the same factor that the LNA gain is decreased in order to maintain the same total gain. In this case, the final input signal amplitude will be about the same as it would be if the high gain were used. While output of the VGA will be slightly noisier than a signal using high LNA gain, it will have less distortion (or no distortion) due to the blocker presence.

Alternatively, the VGA gain can remain at the setting computed using traditional AGC techniques, and downstream circuits can be signaled regarding the use of the intermediate LNA gain, and these circuits can compensate for reduction in gain.

Table 1 provides the settings for the LNA gain based on the value of the useful signal and the detection of a blocker signal. In Table 1 an "X" indicates a don't care situation.

TABLE 1

| | LNA Gains | |
|---|---|---|
| Useful Signal | Blocker Present | LNA Gain |
| Very low | X | High |
| Low | No | High |

TABLE 1-continued

LNA Gains

| Useful Signal | Blocker Present | LNA Gain |
| --- | --- | --- |
| Low | Yes | Intermediate |
| High | X | Low |

The ranges for the "very low", "low" and "high" power levels for the useful signal will vary upon the application. "Very low" power levels are all signal power levels that require a very good signal-to-noise ratio characteristic. For GSM, this corresponds to sensitivity levels around −102 dBm as defined by ETSI standard. "High" power levels are defined as all signal power levels that may induce saturation of the receiver. This value is circuit dependent, but can be defined as all power levels above −40 dBm, when the ETSI standard allows some relaxation on receiver performance. "Low" power level would be in the range between the very low and high power levels.

Figure 1A:
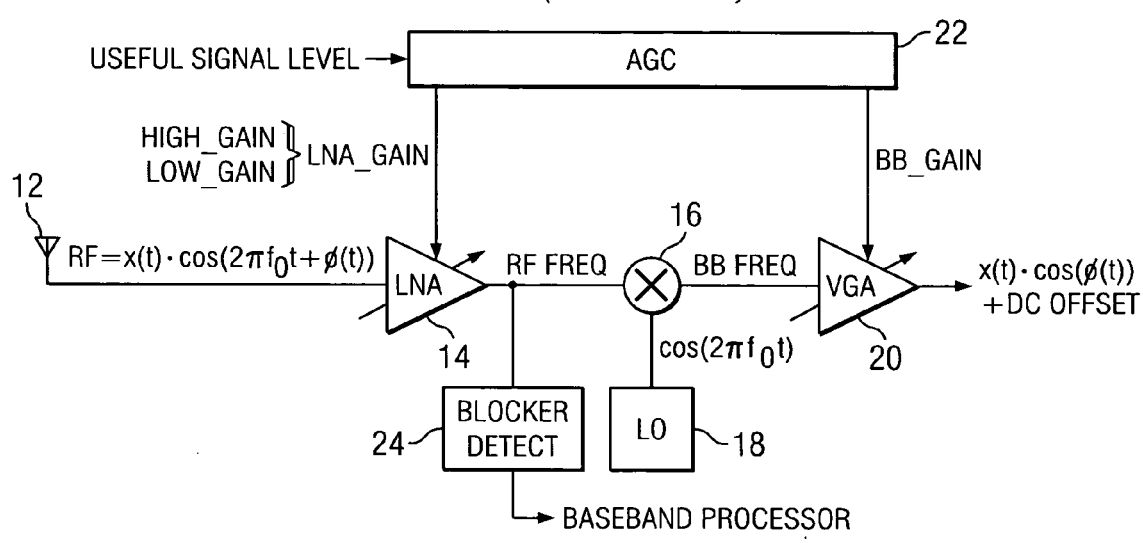
FIG. 1*a* illustrates a basic block diagram of a Direct Conversion Receiver.
Figure 1B:
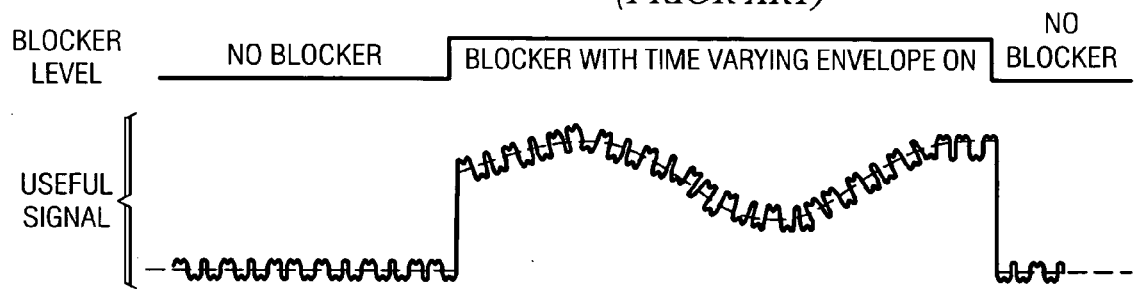
FIG. 1*b* illustrates the effects of a blocker signal on the useful signal.

FIG. 3 illustrates a block diagram of Direct Conversion Receiver 38 using a gain control system 40 implementing the method shown in FIG. 2. Gain control system 40 controls the gain of LNA 42 and VGA 44, using LNA_gain and BB_gain signals, respectively, and outputs a BLOCKER_DETECT signal to the baseband processing circuitry (not shown). Similar to the circuit of FIG. 1a, LNA 42 amplifies signals over antenna 46 and passes the amplified signal to mixer 48. Mixer 48 mixes the signal from LNA 42 with the output of a local oscillator 50, operating at the carrier frequency. The output of mixer 48 is amplified by VGA 44 at a gain specified by the gain control system 40. Gain control system incorporates AGC 52, control 54 and blocker detect circuitry 56. AGC 52 and control 54 receive an indication of the useful signal power level from the baseband processor (or other device). The blocker detect circuitry 56 receives the signal at the output of mixer 48 and determines whether a blocker signal is present at the antenna 46.

The blocker detect circuitry 56 could be, for example, a peak detector, which performs AM demodulation of an incoming signal (i.e., retrieves the envelope of the signal) and retains the highest value reached by the envelope. The peak value is compared to a threshold to determine whether a blocker is present.

In the preferred embodiment, the blocker detect circuitry 56 determines the existence of a blocker signal using the output of mixer 48, rather than the signal at the antenna 46, which has not been amplified. Using the signal at the output of the mixer allows the blocker signal detection to occur at very low frequencies (in the MHz range) relative to the RF signal (in the GHz range) received at the antenna 46. Also, it is easier to distinguish an in-band blocker from an out-of-band blocker signal at the lower frequency. Consequently, the detection circuit 56 can be less complicated, since it is working at a fixed (baseband) frequency rather than over a band of frequencies in the RF range, and it requires less power because it operates at a significantly lower frequency. Also, filtering and distinguishing between frequencies is less demanding at the baseband frequency than at the high RF frequency.

As described in connection with FIG. 2, however, in addition to HIGH_GAIN and LOW_GAIN signals, the gain control system 40 can output an intermediate gain signal (INT_GAIN). INT_GAIN would be used in circumstances where a blocker signal was detected and there was a low (but not very low) useful signal. By performing blocker detection on the signal at the output of mixer 48, the gain of LNA 42 will affect the signal. Hence, it is possible that a blocker signal that would be detected at HIGH_GAIN would not meet the threshold for a blocker signal using INT_GAIN.

Two alternatives could be used to accommodate blocker detection at the INT_GAIN level. First, two different thresholds could be used in the blocker detect signal, responsive to the gain level of the LNA 42. When the LNA_gain is set to a HIGH_GAIN level, a first threshold could be used and when LNA_gain is set to an INT_GAIN level, a second, lower, threshold could be used.

A second alternative is to use a single threshold and set the LNA gain to HIGH_GAIN from time to time to see if a blocking signal is still there. The time intervals between checks increase with successive positive checks (i.e., a blocker signal is detected) until a maximum time interval is reached; when a blocker signal check is negative, the time interval is returned to a default. By starting with a relatively small interval upon a blocker signal detection, noise and other spurious signals, which may appear to the blocker signal detection circuit 56 as a blocker signal, will be quickly detected and the LNA_gain will be quickly restored to HIGH_GAIN. On the other hand, if a legitimate blocker signal is detected, it is likely that the signal will persist for a lengthy period, so the interval between checks is progressively increased, reducing the possibility of lost data during checking points, where LNA_gain will be increased to HIGH_GAIN for accurate blocker detection.

FIG. 4 illustrates a state diagram illustrating operation of the gain control system 40 of FIG. 3, using increasing intervals to confirm the continued presence of a blocker signal. State 60 represents an initial state for a first burst, where variable "Timer" is set to zero to force a blocker detection if the useful signal has a low power level (i.e., the data in the useful signal can be recovered using either HIGH_GAIN or INT_GAIN amplification). In state 62, the useful signal power level is read and the AGC determines gain levels for the LNA 42 (LNA_gain) and VGA 44 (BB_gain) based on the power level of the useful signal. Using standard techniques, the AGC will determine whether the LNA 42 should be at HIGH_GAIN (if useful signal is low or very low) or LOW_GAIN (if useful signal is high).

If the useful signal is either high or very low, then the gain to the LNA is independent of the presence of a blocker signal. In either case, the gains determined by the AGC 52 are used for the LNA 42 and VGA 44 in state 64. The Timer variable is set to the default minimum (MIN_TIMER) and the interval is set to the default minimum (WINDOW_SIZE) as well. In state 66, the system waits for the next burst. With the arrival of next burst, the state returns to state 62, where the power of the useful signal is measured and gains determined.

If the useful signal power level detected as low in state 62, then LNA_gain will depend upon the presence of a blocker signal. In state 68, Timer is decremented and if it is less than zero (which will be the case for the initial gain settings), the LNA_gain is set to HIGH_GAIN and the presence of a blocker signal is detected in state 70. If no blocker is detected in state 70, then Timer is set to the default minimum (MIN_TIMER) and the interval is set to the default minimum (WINDOW_SIZE) in state 64. The gains determined by the AGC 52 are used for LNA 42 and VGA 44. On the next burst, the state returns to state 62, where the power of the useful signal is measured and gains determined.

If a blocker signal is detected in state 70, then Timer is set to MIN_TIMER+Inc_timer (up to a maximum of MAX_TIMER) and Inc_timer is increased by WINDOW_SIZE in state 72. The system then waits for the next burst in state 66. Upon the arrival of the next burst, the useful signal power will be measured again in state 62. In this case, however, with Timer set to MIN_TIMER+Inc_timer, Timer will be greater than zero in state 68 after decrementing Timer and the state will transition to state 74. In state 74, the LNA_gain is set to INT_GAIN, which is equal to HIGH_GAIN−GAIN_DECREASE. GAIN_DECREASE can be added to the BB_gain determined by the AGC 52 to keep the total gain (LNA_gain+BB_gain) the same as that determined by the AGC 52. This allows the change in gain to be relatively transparent to other portions of the circuit. Alternatively, the decrease in gain can be compensated by other circuits, as appropriate, upon receiving a signal indicative to the reduction in gain to the LNA 42. After the gain(s) are adjusted in state 74, the system waits for the next burst in state 66.

Referring again to state 68, so long as Timer≧0, then the LNA 42 remains set at a gain of INT_GAIN until either Timer<0 or the useful signal transitions to either a high or very low power level.

Accordingly, after detecting a blocker signal, the LNA_gain will be set to INT_GAIN. At increasing intervals, LNA_gain will be set to HIGH_GAIN to check for a blocker signal that may otherwise be undetected due to the lower gain. So long as the blocker signal is detected at HIGH_GAIN, the interval will increase up to a maximum interval. Once the blocker is not detected, or after a condition where LNA_gain is set to high gain due to the power level of the useful signal, Timer and Inc_timer are set to default minimum values.

The present invention provides significant advantages over the prior art. The control of the LNA gain to provide three levels, HIGH_GAIN, INT_GAIN and LOW_GAIN, can be used to reduce coupling between the RF and LO inputs to the mixer, thus reducing the effect of dynamic DC offsets when a blocker signal is present. By checking for the presence of a blocking signal from the low frequency signal at the output of the mixer, a simpler, reduced power detection circuit can be used.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

The invention claimed is:

1. A receiver comprising:
    a low noise amplifier having a variable gain for inputting a radio frequency signal, including a useful signal modulated at a carrier frequency, and outputting an amplified radio frequency signal;
    a local oscillator for generating a local oscillator signal at the carrier frequency;
    a mixer for mixing the amplified signal and the local oscillator signal to output a demodulated signal;
    circuitry for detecting whether a blocker signal is present on the radio frequency signal;
    control circuitry for controlling the gain of the low noise amplifier responsive to the presence of the blocker signal if the power level of the useful signal is between first and second thresholds and responsive to the power level of the useful signal if the power level is either below the first threshold or above the second threshold.

2. The receiver of claim 1 wherein the detecting circuitry determines the presence of the blocker signal from the output of the mixer.

3. The receiver of claim 2 wherein the detecting circuitry compares an amplitude associated with an envelope of the demodulated signal with a predetermined threshold.

4. The receiver of claim 2 wherein the detecting circuitry compares the amplitude of the demodulated signal with one of a set of thresholds responsive to the gain of the low noise amplifier.

5. The receiver of claim 1 wherein the control circuitry amplifies the radio frequency signal at one of at least three different gains.

6. The receiver of claim 1 wherein the control circuitry normally sets the low noise amplifier to an intermediate gain when a blocker signal is present and a high gain is used temporarily at intervals to detect the continued presence of the blocker signal.

7. The receiver of claim 6 wherein the intervals increase in length during continued presence of the blocker signal continues to be present.

8. A method of receiving a radio frequency signal, comprising the steps of:
    amplifying the radio frequency signal with a low noise amplifier having a variable gain for inputting the radio frequency signal, including a useful signal modulated at a carrier frequency, and outputting an amplified radio frequency signal;
    generating a local oscillator signal at the carrier frequency;
    mixing the amplified radio frequency signal and the local oscillator signal to output a demodulated signal;
    detecting whether a blocker signal is present on the radio frequency signal;
    controlling the gain of the low noise amplifier responsive to the presence of the blocker signal if the power level of the useful signal is between first and second thresholds and responsive to the power level of the useful signal if the power level is either below the first threshold or above the second threshold.

9. The method of claim 8 wherein the step of detecting whether a blocker signal is present from the demodulated signal.

10. The method of claim 9 wherein the detecting step comprises the step of comparing an amplitude associated with an envelope of the demodulated signal with a predetermined threshold.

11. The method of claim 9 wherein the detecting step comprises the step of comparing the amplitude of the demodulated signal with one of a set of thresholds responsive to the gain of the low noise amplifier.

12. The method of claim 8 wherein the controlling step comprises the step of setting the low noise amplifier to one of three different gains responsive to the power level of the useful signal and the presence of the blocker signal.

13. The method of claim 12 wherein the controlling step normally sets the low noise amplifier to an intermediate gain when a blocker signal is present and further comprising the step of temporarily setting the low noise amplifier to a high gain at intervals to detect the continued presence of the blocker signal.

14. The method of claim 13 wherein the controlling step increases the length of the intervals during continued presence of the block signal.

* * * * *